(12) United States Patent
Song et al.

(10) Patent No.: US 11,428,551 B2
(45) Date of Patent: Aug. 30, 2022

(54) ULTRASONIC TELEMETRY FOR ROTATING SENSORS

(71) Applicant: ExxonMobil Technology and Engineering Company, Annandale, NJ (US)

(72) Inventors: Limin Song, West Windsor, NJ (US); Yibing Zhang, Annandale, NJ (US); Mark M. Disko, Glen Gardner, NJ (US)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 106 days.

(21) Appl. No.: 16/785,828

(22) Filed: Feb. 10, 2020

(65) Prior Publication Data

US 2020/0300674 A1 Sep. 24, 2020

Related U.S. Application Data

(60) Provisional application No. 62/820,965, filed on Mar. 20, 2019.

(51) Int. Cl.
*G08C 23/02* (2006.01)
*H04B 11/00* (2006.01)
(Continued)

(52) U.S. Cl.
CPC ............... *G01D 5/48* (2013.01); *H04Q 9/00* (2013.01); *H04Q 2209/10* (2013.01); *H04Q 2209/84* (2013.01)

(58) Field of Classification Search
None
See application file for complete search history.

(56) References Cited

U.S. PATENT DOCUMENTS

2013/0328442 A1* 12/2013 Hay .................. H01L 41/125
310/300
2015/0114714 A1* 4/2015 Dahl .................. E21B 49/005
175/40
(Continued)

FOREIGN PATENT DOCUMENTS

CA 2581165 A1 * 4/2006 ........... E21B 43/003
CN 108351074 A * 7/2018 ........... H05B 1/0244
(Continued)

*Primary Examiner* — Curtis A Kuntz
*Assistant Examiner* — Jerold B Murphy
(74) *Attorney, Agent, or Firm* — Scott F. Yarnell

(57) ABSTRACT

Embodiments described herein include an acoustic telemetry system for use with an apparatus configured to rotate. The acoustic telemetry system includes one or more sensor nodes and at least one receiver node. In at least one embodiment, the telemetry system also includes at least one hub node positioned on the apparatus. Each sensor node is attached to or embedded in the apparatus. Each sensor node obtains data related to one or more operating conditions of the apparatus and the environment surrounding the apparatus. The one or more sensor nodes encode and transmit the data to the hub node or the receiver node using ultrasonic acoustic waves. In at least one embodiment, the hub node transmits the data to the receiver node. The receiver node decodes the data and monitors the one or more operating conditions of the apparatus.

21 Claims, 2 Drawing Sheets

(51) Int. Cl.
*G01D 5/48* (2006.01)
*H04Q 9/00* (2006.01)

(56) References Cited

U.S. PATENT DOCUMENTS

2016/0299019 A1* 10/2016 Curlier ................... G01L 1/165
2016/0356152 A1* 12/2016 Croux ................... H04W 40/12
2018/0058206 A1* 3/2018 Zhang ................. E21B 41/0085
2018/0058209 A1* 3/2018 Song .................... E21B 47/017

FOREIGN PATENT DOCUMENTS

| CN | 109163655 A | * | 1/2019 |
| WO | 2014100272 A1 | | 6/2014 |
| WO | 2014100275 A1 | | 6/2014 |

* cited by examiner

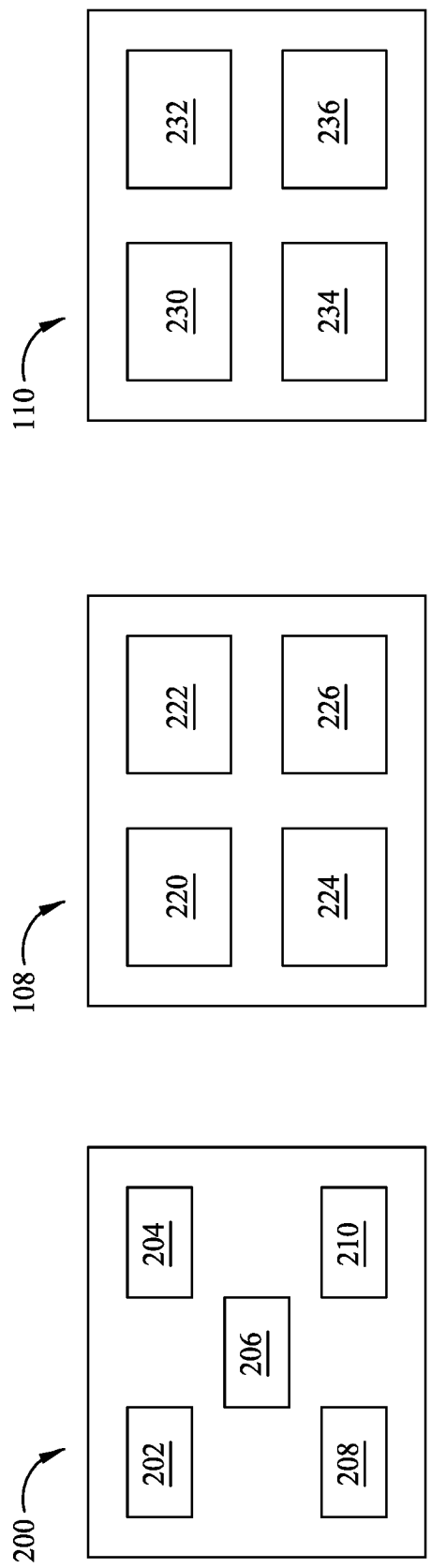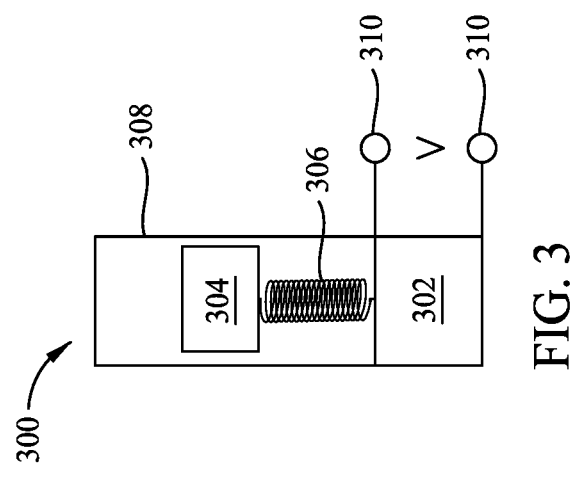

ULTRASONIC TELEMETRY FOR ROTATING SENSORS

CROSS-REFERENCE TO RELATED APPLICATIONS

This application claims the benefit of U.S. Provisional Application No. 62/820,965, filed on Mar. 20, 2019, the disclosure of which is incorporated herein by reference in its entirety.

FIELD OF THE INVENTION

This disclosure relates generally to the field of data transmission and, more particularly, apparatus and methods for using ultrasonic telemetry to transmit data along and through rotating apparatus.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not as admissions of prior art.

Various operating conditions of a rotating apparatus can be monitored and used to improve efficiency and performance of the rotating apparatus. Data regarding the operating conditions of the rotating apparatus can be analyzed to determine a status of the rotating apparatus. The data can be used to reduce an occurrence of damage to the rotating apparatus or optimize maintenance of the apparatus, e.g., increase a time interval between maintenance of the rotating apparatus and reduce a resultant unproductive time. For example, a temperature of a turbine can be monitored to prevent overheating of a turbine and associated equipment. As another example, properties of a lubricant can be monitored to monitor possible lubricant degradation.

Conventional techniques include stationary sensors installed on a casing or stationary part of the rotating apparatus. The sensors of conventional techniques utilize electromagnetic signals (e.g., radio frequency (RF) signals) or a slip-ring with metallic brushes. However, each of these techniques has limitations in transmitting data from a sensor on the rotating apparatus to a stationary receiver positioned adjacent to the apparatus. If the sensor is stationary and not mounted on the rotating apparatus, the sensor is not in contact with the rotating apparatus and thus provides indirect and potentially inaccurate measurements of the operating condition being monitored. Other limitations arise if the sensors are attached to the rotating apparatus. For example, RF signals cannot travel along a transmission path that is electrically shielded or that includes conductive materials. A slip-ring provides a physical electrical connection between a rotating sensor and the metallic brushes. However, this physical connection is subject to wear over time. Further, performance of a slip-ring can be negatively affected by, for example, dirt or grease, which is between the contact portions of the slip-ring.

Improved and more efficient techniques for data transmission along or through a rotating apparatus are needed (e.g., from inside of a sealed steel rotating apparatus to outside of the rotating apparatus for status monitoring).

SUMMARY OF THE INVENTION

In one embodiment, an ultrasonic telemetry system is provided. The ultrasonic telemetry system includes one or more ultrasonic sensors nodes embedded in and spaced along an apparatus that is configured to rotate. Each of the one or more ultrasonic sensor nodes is configured to sense one or more operating conditions of the apparatus. An ultrasonic receiver disposed proximate to the apparatus, the ultrasonic receiver configured to receive one or more ultrasonic acoustic waves associated with the one or more operating conditions from the one or more ultrasonic acoustic waves.

In another embodiment, an ultrasonic telemetry system is provided. The ultrasonic telemetry system includes one or more ultrasonic sensors nodes embedded in and spaced along an apparatus that is configured to rotate. Each of the one or more ultrasonic sensor nodes is configured to sense one or more operating conditions of the apparatus. An ultrasonic hub node is disposed on the apparatus. The ultrasonic hub node is configured to receive ultrasonic acoustic waves indicative of the one or more operating conditions from the one or more ultrasonic sensor nodes. An ultrasonic receiver is disposed proximate to the apparatus.

In still another embodiment, a method of monitoring operating conditions of an apparatus is provided. The method includes obtaining, by one or more ultrasonic sensor nodes embedded in an apparatus, data related to one or more operating conditions of the apparatus. The method also includes receiving, at an ultrasonic hub node disposed on the apparatus, one or more ultrasonic waves from one or more ultrasonic sensors. The method also includes transmitting the one or more ultrasonic waves to an ultrasonic receiver adjacent to the apparatus. The method also includes analyzing the one or more ultrasonic waves to evaluate the one or more operating conditions of the rotating apparatus.

BRIEF DESCRIPTION OF THE DRAWINGS

So that the manner in which the recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 2A illustrates a schematic view of an exemplary sensor node according to one or more embodiments.

FIG. 2B illustrates a schematic view of an exemplary hub node according to one or more embodiments.

FIG. 2C illustrates a schematic view of an exemplary stationary node according to one or more embodiments.

FIG. 3 illustrates a schematic view of an exemplary power harvester according to one or more embodiments.

DETAILED DESCRIPTION OF THE INVENTION

Figure 1:
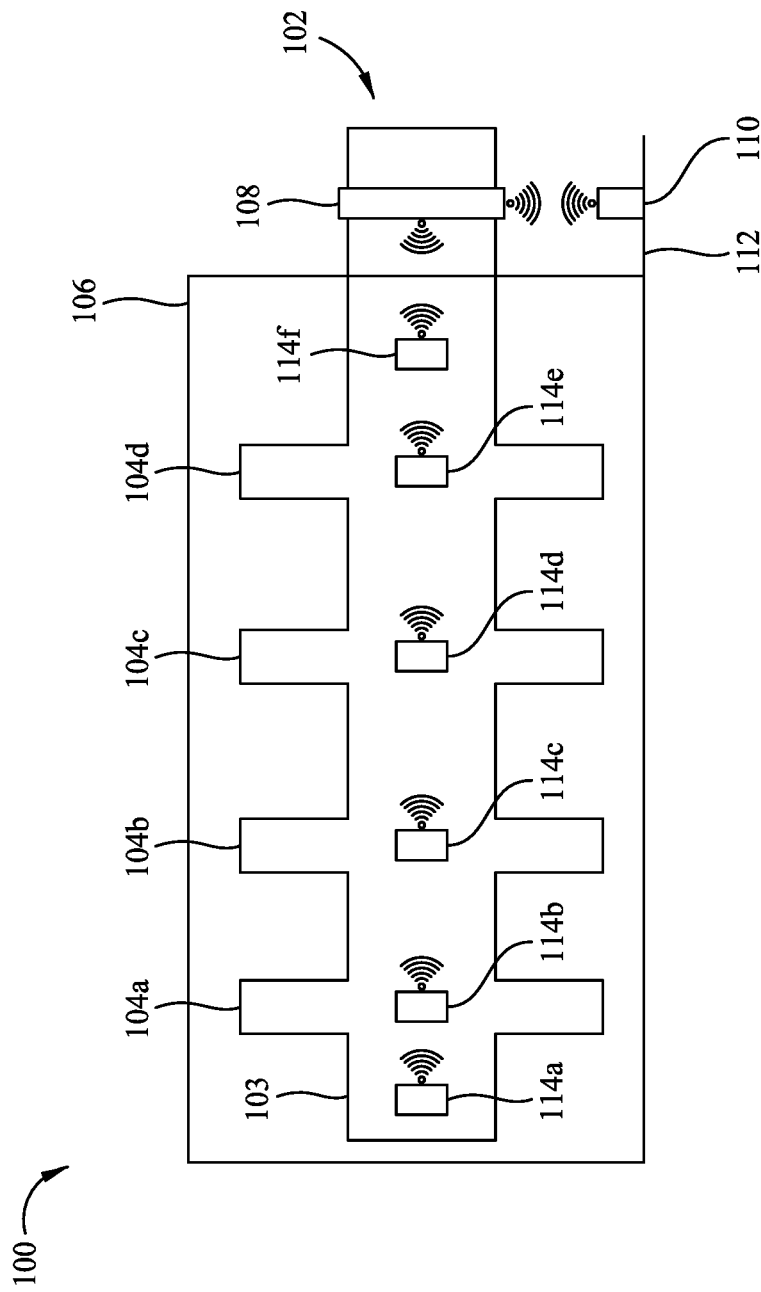
FIG. 1 illustrates a schematic view of a node network according to one or more embodiments.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about ±10% variation.

Embodiments described herein include an acoustic telemetry system for use with an apparatus configured to rotate. The acoustic telemetry system includes one or more sensor nodes and at least one receiver node. In at least one embodiment, the telemetry system also includes at least one hub node positioned on the apparatus. Each sensor node is attached to or embedded in the apparatus. Each sensor node obtains data related to one or more operating conditions of the apparatus and the environment surrounding the apparatus. The one or more sensor nodes encode and transmit the data to the hub node or the receiver node using ultrasonic acoustic waves. In at least one embodiment, the hub node transmits the data to the receiver node. The receiver node decodes the data and monitors the one or more operating conditions of the apparatus.

The rotating apparatus may include one of a motor, gear, pump, compressor, turbine, drill pipe, or other metallic or non-metallic sealed rotating equipment. The rotating apparatus may further include various parts such as a shaft, blades, and bearings that rotate about the shaft. The telemetry system described herein utilizes ultrasonic waves to transmit data through various media. A frequency of the acoustic waves utilized by the telemetry system described herein can be from about 20 kHz to about 4 MHz, for example, from about 80 kHz to about 1.5 MHz, such as about 100 kHz.

The acoustic telemetry system includes at least one sensor node and at least one stationary receiver node. In at least one embodiment, the telemetry system also includes at least one hub node positioned on the rotating apparatus. Each sensor node is attached to or embedded in the rotating apparatus. That is, each sensor node rotates with the rotating apparatus. Each sensor node obtains data related to one or more operating conditions of the rotating apparatus and the environment surrounding the rotating apparatus. For example, the operating conditions of the rotating apparatus may include vibration, temperature of all or a portion of the rotating apparatus, a position of the shaft, displacement of the shaft, a shape of the shaft, an ambient temperature, pressure, strain, stress, force, torque, revolutions per minute (RPM), lubricant degradation, chemical analysis of oil/lubricant, a displacement of the oil/lubricant, or a combination thereof.

In some embodiments, the sensor nodes are used for active sensing to detect, for example, a crack or a defect in a rotating element (e.g., a shaft, blade, impeller, etc.). The crack or defect in the rotating element may be identified based on a reflection of ultrasonic wave pulses. For example, a particular sensor node may transmit an ultrasonic pulse through or toward the rotating element. If the ultrasonic pulse is reflected back to the sensor node, the reflection may indicate a crack or defect has formed in the rotating element.

In some embodiments, two sensor nodes separated by a distance may be used to actively sense a crack or defect in the rotating element. For example, a first sensor node may transmit an ultrasonic pulse through the rotating element toward a second node. A change in the ultrasonic pulse received by the second node may indicate a change in the structure of the rotating element, such as a crack, a location of the crack, or a change (e.g., growth) of the crack.

A depth of the sensor node embedded in the rotating apparatus may be varied based on the operating condition being monitored, material used to fabricate the rotating apparatus, and the manufacturing process of the rotating apparatus. The sensor nodes encode and transmit the data to the receiving node. In at least one embodiment, the sensor node transmits the data to the receiving node using ultrasonic waves. The receiving node receives the data from the sensor nodes and decodes the data. In at least one embodiment, the receiving node processes the data to analyze the operating conditions of the rotating apparatus.

The telemetry systems may be used as part of a condition-based maintenance program to constantly monitor operating conditions of a rotating apparatus. In at least one embodiment, the receiving node generates and transmits a notice to alert an operator of the operating condition based on the data. In at least one embodiment, the receiving node transmits a command to the sensor node for the sensor node to perform a specific task, such as obtain updated data regarding the operating conditions and/or send obtained data to the receiving node.

The amplitude or shape of the ultrasonic waves used by the telemetry system may be used to detect changes in the rotating apparatus or surrounding media. For example, if the amplitude or shape of a signal changes between transmission and receipt, the change in the amplitude or shape could indicate an irregularity in the transmission medium. That is, if the acoustic waves are travelling through metal, the change in the amplitude or shape could indicate a crack in the metal. Similarly, the amplitude or shape of the acoustic waves travelling through a fluid could be used to identify a change in properties of the fluid.

One of the many potential advantages of the embodiments of the present disclosure is enhanced reliability of a telemetry system for a rotating apparatus. Such enhanced reliability may improve the accuracy and efficiency of transmitting signals along or through the rotating apparatus and reduce the mean time between failures (MTBF) over conventional telemetry systems. Another potential advantage includes an increased distance between sensor nodes and a hub node independent of the medium between the nodes. That is, ultrasonic signals enable signals to be transmitted through various media that would not work with other telemetry systems, such as an RF telemetry system. Further, telemetry systems of the present disclosure do not require use of any wired connections between the sensor nodes, hub node, or receiver node. That is, telemetry systems described herein do not require entry points into an enclosure of the rotating apparatus for wires to pass there through. Thus, an occurrence of pressurized fluid leaking into the enclosure or contaminants entering the enclosure through entry points is substantially reduced.

FIG. 1 illustrates a schematic view of a node network 100 positioned to monitor operating conditions of a rotating apparatus 102, according to one or more embodiments. As discussed herein, the rotating apparatus 102 includes a shaft 103, one or more rotating elements 104a-d, an enclosure 106, and an extension 112. The shaft 103 is disposed at least partially within the enclosure 106. The shaft 103 extends from at least one side of the enclosure 106. The one or more rotating elements 104a-d are positioned on the shaft 103 and within the enclosure 106. The rotating elements 104a-d extend laterally from and substantially normal to a major axis of the shaft 103. The rotating elements 104a-d are disposed substantially symmetric about the shaft 103 to enable balanced rotation of the shaft 103 about the major axis. The extension 112 is substantially parallel to the major axis of the shaft 103 and extends laterally from the enclosure 106.

The node network 100 includes one or more sensor nodes 114*a-f*, a hub node 108, and a receiver node 110. The one or more sensor nodes 114*a-f* are positioned along the shaft 103 to provide direct measurements of operating conditions of various parts of the rotating apparatus 102. One or more of the sensor nodes 114*a-f* are positioned adjacent to the rotating elements 104*a-d* to measure operating conditions of the rotating elements 104*a-d*. In some embodiments, one or more of the sensor nodes 114*a-f* are disposed in the rotating elements 104*a-d*. One or more of the sensor nodes 114*a-f* may also be positioned between the rotating elements 104*a-d* or adjacent an end of the shaft 103 to measure operating conditions of the shaft 103.

In at least one embodiment, the sensor nodes 114*a-f* are embedded in the rotating apparatus 102. A depth of the sensor nodes 114*a-f* depends on a particular application of the sensor nodes 114*a-f*. A depth of the sensor nodes 114*a-f* embedded in the rotating apparatus 102 is from about 0.01 cm to about 25 cm. In some embodiments, the sensor nodes 114*a-f* are embedded in the rotating apparatus at a depth of from about 0.05 cm, 0.1 cm, 0.2 cm, 0.3 cm, 0.5 cm, or 1 cm to about 1.2 cm, 1.3 cm, 1.5 cm, 2 cm, or 5 cm. In other embodiments, the sensor nodes 114*a-f* are embedded in the rotating apparatus at a depth of from about 1 cm, 2 cm, 5 cm, or 8 cm to about 10 cm, 12 cm, 15 cm, or 20 cm. For example, at least one of the senor nodes 114*a-f* is embedded in the rotating apparatus at a depth of from about 1 cm to about 5 cm, such as about 3 cm.

In at least one embodiment, the sensor nodes 114*a-f* are embedded in the shaft 103 at a single depth. In another embodiment, the sensor nodes 114*a-f* are embedded in the shaft 103 at different depths. In some embodiments, one or more of the sensor nodes 114*a-f* is a fastener, such as a bolt, coupled to the rotating apparatus. In other embodiments, one or more of the sensor nodes 114*a-f* are coupled to the shaft 103 via, for example, a strap (not shown).

Conventional sensors positioned external to a rotating apparatus provide indirect measurements of operating conditions of the rotating apparatus. Indirect measurements of the operating conditions may result in data that does not reflect the actual operating conditions. Direct measurements provide improved accuracy of the data as compared to indirect measurements. Direct measurements may be achieved by positioning the sensor nodes 114*a-f* on or in the rotating apparatus 102 and in close proximity to the rotating element 104*a-d* of the rotating apparatus 102 that is being monitored. For example, a given sensor node 114*b* may be embedded in a turbine shaft less than 5 cm from a feature 104*a* (e.g., a turbine blade) being monitored, such as from about 0.5 cm to about 1.5 cm from the turbine blade. In some embodiments, a distance between the sensor node 114*a-f* and the rotating element 104*a-d* being monitored is about 20 cm.

In other embodiments, the distance between a given the sensor node, such as sensor node 114*d* and a corresponding feature of the apparatus, such as feature 104*c*, being monitored is from about 0.01 cm, 0.1 cm, 0.5 cm, 1 cm, or 1.5 cm, to about 2 cm, 3 cm, 5 cm, 8 cm, 10 cm, 15 cm, or 20 cm. In still other embodiments, the distance between the sensor node and the feature being monitored is from about 2 cm, 3 cm, 4, cm, or 5 cm to about 6 cm, 8 cm, or about 10 cm. For example, the distance between the sensor node and the feature being monitored may be from about 1 cm to about 2 cm, such as about 1.5 cm. In other embodiments, the sensor node is embedded in the feature being monitored.

The hub node 108 is disposed on the shaft 103. In at least one embodiment, the hub node 108 is positioned external to the enclosure 106. In other embodiments, the hub node 108 is positioned within the enclosure 106. In at least one embodiment, the hub node 108 is embedded in the rotating apparatus 102. The receiver node 110 is disposed on the extension 112 external to the enclosure 106. In at least one embodiment, the receiver node 110 is positioned adjacent to the hub node 108. In some embodiments, the receiver node 110 may be disposed proximate to (i.e., on, in physical contact with, or adjacent to) the rotating apparatus 102.

In operation, the sensor nodes 114*a-f* rotate with the shaft 103 and obtain data related to one or more operating conditions of the rotating apparatus 102. The sensor nodes 114*a-f* encode and transmit the data to the hub node 108 via ultrasonic waves. The ultrasonic waves enable transmission of the data through various media that are incompatible with conventional telemetry techniques. For example, ultrasonic waves enable transmission of the data through conductive media such as metal or conductive fluids.

The data received by the hub node 108 is transmitted to the receiver node 110. A Doppler Effect may occur if the frequency of the ultrasonic waves is altered while the hub node 108 is rotating with the shaft 103. The Doppler Effect can be used to determine a rotational velocity of the hub node 108 and thus the rotational velocity of the shaft 103. Once received, the receiver node 110 decodes the data. In at least one embodiment, the receiver node 110 determines whether the data indicates a problem with the rotating apparatus 102. If so, the receiver node may send instructions to a controller (not shown) of the rotating apparatus 102 to adjust aspects of the rotating apparatus 102. For example, the signal may be sent to the controller to reduce an RPM of the rotating apparatus 102, adjust a position of one or more of the rotating elements 104*a-d*, adjust an operational load on the rotating apparatus 102, or shut down the rotating apparatus 102. In at least one embodiment, the data may also be transmitted to a control center for analysis by a human operator. The operator may determine whether a remedial action should be taken regarding the rotating apparatus 102.

In at least one embodiment, the receiver node 110 digitalizes and stores the data in a storage location (not shown). In some embodiments, the storage location is local on the receiver node 110. In other embodiments, the storage location is at a remote location. In that case, the receiver node 110 may transmit the data to the storage location via a wireless network, such as a local area network (LAN), wide area network (WAN), or a combination thereof. The data in the storage location may be accessed by a monitor apparatus (not shown) that determines whether the operating conditions of the rotating apparatus 102 satisfy a threshold. In some embodiments, the monitor apparatus predicts when the one or more operating conditions could exceed the threshold.

Direct measurements of operating conditions by the sensor nodes 114*a-f* enable early detection of incipient problems or faults of the rotating apparatus 102. Early detection of problems or faults may prevent (e.g., reduce or eliminate) damage to the rotating apparatus 102 and prevent the occurrence of unplanned shutdowns of the rotating apparatus 102.

FIG. 2A illustrates a schematic view of an exemplary sensor node 200 according to one or more embodiments. The sensor node 200 corresponds to the sensor nodes 114*a-f* discussed with respect to FIG. 1 The sensor node 200 includes a power source 202, a transducer 204, a controller 206, one or more sensors 208, and one or more circuits 210. The sensor node 200 is disposed on or embedded in the rotating apparatus 102 illustrated in FIG. 1.

In at least one embodiment, the power source 202 is a battery. In another embodiment, the power source 202 is a power harvester which converts kinetic energy into electrical energy. For example, the power source 202 may be a piezoelectric generator as discussed with respect to FIG. 3 below. The power source 202 is connected to the transducer 204, the controller 206, and the one or more sensors 208 via the electronic circuits 210. The transducer 204 is an ultrasonic transducer capable of sending and receiving ultrasonic signals. In at least one embodiment, the transducer 204 is a piezoelectric transducer including one or more piezoelectric sensors.

The one or more sensors 208 obtain data regarding the one or more operating conditions of the rotating apparatus 102. Each of the one or more sensors 208 is at least one of a temperature sensor, a pressure sensor, a vibration sensor, a strain sensor, a stress sensor, a chemical sensor, a Doppler shift sensor, a fluid resistivity sensor, a fluid density sensor, or a combination thereof. The data obtained by the one or more sensors 208 may include at least one of temperature, pressure, vibration, strain, stress, force, torque, rpm, lubricant degradation, or chemical analysis of oil/lubricant. The data is transmitted to the controller 206 via the one or more electronic circuits 210.

The controller 206 is coupled to the one or more sensors 208 and the transducer 204 via the one or more electronic circuits 210. The controller 206 sends and receives signals from the transducer 204 and the one or more sensors 208. In some embodiments, the controller 206 is a central processing unit (CPU). For example, the controller 206 may retrieve and execute programming instructions. In that case, the controller 206 is representative of a single CPU, multiple CPUs, a single CPU having multiple processing cores, and the like.

In at least one embodiment, the controller 206 receives and encodes signals from the one or more sensors 208. Once the data is encoded, the data is transmitted by the transducer 204 using ultrasonic acoustic waves to the hub node 108 illustrated in FIGS. 1 and 2B. In at least one embodiment, the ultrasonic waves represent asynchronous packets of information comprising a plurality of separate tones, with at least some of the ultrasonic waves indicating a sensed operating condition of the rotating apparatus.

In at least one embodiment, the controller 206 determines a frequency at which the ultrasonic waves are transmitted to the hub node 108. The controller 206 may use multi frequency-shift keying (MFSK) to determine the frequency to transmit the data. Thus, the receiver node 110 receives ultrasonic signals at various frequencies. In at least one embodiment, the transducer 204 of a first sensor node, such as the sensor node 114a illustrated in FIG. 1, transmits the data to a second sensor node, such as the sensor node 114b positioned along the rotating apparatus 102 between the first sensor node 114a and the hub node 108. That is, a given sensor node 114 may relay signals from other sensor nodes 114.

In some embodiments, the controller 206 may perform one or more signal processing operations on raw data from one or more sensor nodes 200. The controller 206 may compress the data to be transmitted. In some embodiments, the controller 206 performs other logic operations, such as transmitting critical data or generating and transmitting an alert to the receiver node 110. The alert may indicate a problem with the rotating apparatus 102.

As illustrated, the power source 202, the transducer 204, the controller 206, and the one or more sensors 208 are disposed within the sensor node 200. It is contemplated that these components may be embedded in a rotating apparatus, such as the rotating apparatus 102, separately. Further, each of the components of the sensor node 200 may be embedded in the rotating apparatus at different depths. For example, the one or more sensors 208 may be embedded at a depth greater than a depth of the transducer 204. The larger depth of the one or more sensors 208 provides the sensors to be closer to the feature of the rotating apparatus 102 being monitored. The smaller depth of the transducer 204 enables more efficient transmission of the ultrasonic waves. In at least one embodiment, the one or more sensors 208 may be embedded at a depth of from about 2 cm, 3 cm, or 5 cm to about 8 cm, 10 cm, or 15 cm while the transducer 204 is embedded at a depth of from about 0.01 cm to about 3 cm.

FIG. 2B illustrates a schematic view of an exemplary hub node 108 according to one or more embodiments. The hub node 108 includes a power source 220, a transducer 222, a controller 224, and one or more electronic circuits 226. In at least one embodiment, the power source 220 is similar to the power source 202 of the sensor node 200 illustrated in FIG. 2A. Thus, the power source 220 may be a battery or a power harvester. The transducer 222 is an ultrasonic transducer capable of sending and receiving ultrasonic signals. The transducer 222 receives the encoded data from one or more sensor nodes 200 and transmits the encoded data to the receiver node 110 illustrated in FIGS. 1 and 2C. The transducer 222 transmits the data using ultrasonic waves. In at least one embodiment, the transducer 222 is a piezoelectric transducer including one or more piezoelectric sensors.

The transducer 222 may receive acoustic waves that are not ultrasonic. For example, vibrations from the rotating apparatus may be received by the transducer 222. The lower frequency vibration may indicate that the rotating apparatus 102 is out of balance. In that case, the hub node 108 may generate and transmit an alert to the receiver node 110 or another receiver that is external or remote from the rotating apparatus 102. The alert may indicate the presence of a potential problem with the rotating apparatus 102 that should be addressed. Depending on a frequency of the vibration detected, the alert may be sent to the controller (not shown) of the rotating apparatus 102 to shut down the rotating apparatus 102. In at least one embodiment, the hub node 108 generates and transmits a signal to a mass (not shown) moveably disposed in the rotating apparatus 102. The signal may cause the mass to move to adjust a rotational balance of the rotating apparatus 102. Once the lower frequency vibration is no longer detected, the transducer 222 continues to receive and monitor data from the sensor node 200.

The controller 224 is similar to the controller 206 of the sensor node 200. The controller 224 is coupled to the transducer 222 via the one or more electronic circuits 226. Once data is received from the sensor node 200, the controller 224 instructs the transducer 222 to transmit the received data to the receiver node 110. In some embodiments, the controller 224 may perform one or more analytic operations on data obtained from more than one sensor node 200. For example, the controller 224 may request more than one sensor node 200 to re-send data previously transmitted or send additional data if necessary to perform a particular operation.

FIG. 2C illustrates a schematic view of an exemplary receiver node 110 according to one or more embodiments. The receiver node 110 includes a power source 230, a transducer 232, a controller 234, and one or more electronic circuits 236. The power source 230 may be a battery or an external power source. As illustrated, the power source 230 is positioned within the receiver node 110. However, it is contemplated that the power source 230 is external to the receiver node 110. For example, the power source 230 may be a power generator coupled to the receiver node via one or more cables (not shown).

The transducer 232 is an ultrasonic transducer capable of sending and receiving ultrasonic signals. In at least one embodiment, the transducer 222 is a piezoelectric transducer. The transducer 232 is coupled to the controller and the power source via the one or more electronic circuits 236. The transducer 232 receives the encoded data from the hub node. The controller 234 is similar to the controllers 206 and 224 of the sensor node 200 and the hub node 108, respectively. The controller 234 decodes and digitalizes the data. In at least one embodiment, the controller 234 stores the data in a storage location as discussed with respect to FIG. 1.

FIG. 3 illustrates a schematic view of a power harvester 300 according to one or more embodiments. The power harvester 300 includes a piezoelectric generator 302, a mass 304, a spring 306, an enclosure 308, and leads 310. In operation, the spring 306 is stretched and compressed as the mass 304 moves inside the enclosure 308. The piezoelectric generator 302 converts the kinetic energy of the spring 306 to electrical energy. A power storage device (not shown) may be coupled to the leads 310. For example, a battery or capacitor may be coupled to the leads 310. As kinetic energy is converted to electrical energy, the electrical energy is stored in the power storage device and is used to provide power to various components of the sensor node 200 or the hub node 108.

In at least one embodiment, an external charger (not shown) may be located proximate to the rotating apparatus 102. The external charger may emit acoustic waves at a particular frequency to induce movement of the mass 304 of the power harvester 300 and produce electrical energy which can be stored in a capacitor or other power storage device.

While examples of the telemetry system described herein relate to rotating apparatus such as a turbine, it is to be understood that the telemetry system can be used with other rotating equipment. For example, the telemetry system described herein can be used in downhole applications of an oil or gas well. One or more sensor nodes, such as the one or more sensor nodes 114a-f illustrated in FIG. 1, may be attached to or embedded in a pipe used to drill the oil or gas well. The one or more sensor nodes rotate with the pipe as the well is drilled. In at least one embodiment, the one or more sensors are embedded in a casing which surrounds the well bore. The sensor nodes obtain data related to one or more operating conditions of the pipe. The sensor nodes may also obtain data related to properties of fluid in the well bore or surrounding the pipe.

The hub node 108 is disposed on or embedded in the drill pipe near a surface. In at least one embodiment, the hub node 108 is disposed on or embedded in the drill pipe above the surface. The receiver node 110 is disposed on or near the surface proximate to the well bore. During operation, the one or more sensor nodes encode and transmit the obtained data to the hub node 108 via ultrasonic acoustic waves. In at least one embodiment, the hub node 108 transmits the data to the receiver node. The receiver node decodes the data and monitors the operating conditions of the pipe.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated.

The foregoing description is directed to particular example embodiments of the present technological advancement. It will be apparent, however, to one skilled in the art, that many modifications and variations to the embodiments described herein are possible. All such modifications and variations are intended to be within the scope of the present disclosure, as defined in the appended claims.

We claim:

1. An ultrasonic telemetry system, comprising:
two or more ultrasonic sensor nodes embedded within and spaced along an apparatus that is a shaft of a turbine and configured to rotate, each of the two or more ultrasonic sensor nodes configured to sense one or more operating conditions of the apparatus;
two or more blades disposed on the apparatus and spaced along the apparatus, wherein at least one of the two or more ultrasonic sensor nodes is disposed between two blades of the two or more blades, the two blades disposed opposite one another on the apparatus, wherein a distance between at least one ultrasonic sensor node of the two or more ultrasonic sensor nodes and at least one of the blades is about 1 cm to about 8 cm; and
an ultrasonic receiver disposed proximate to the apparatus, the ultrasonic receiver configured to receive one or more ultrasonic acoustic waves associated with the one or more operating conditions from the one or more ultrasonic acoustic waves.

2. The ultrasonic telemetry system of claim 1, wherein the two or more ultrasonic sensor nodes are embedded within the apparatus at a depth of about 1 cm to about 5 cm.

3. The ultrasonic telemetry system of claim 1, wherein a distance between at least one ultrasonic sensor node of the two or more ultrasonic sensor nodes and a feature of the apparatus being monitored is about 1 cm to about 8 cm.

4. The ultrasonic telemetry system of claim 1, wherein each of the two or more ultrasonic sensor nodes comprises:
a power source;
a controller;
one or more sensors; and
one or more ultrasonic transducers configured to identify and monitor at least one of the one or more operating conditions, the one or more ultrasonic transducers configured to transmit ultrasonic acoustic waves indicative of the at least one of the one or more operating conditions.

5. The ultrasonic telemetry system of claim 4, wherein the ultrasonic acoustic waves represent asynchronous packets of information comprising a plurality of separate tones, wherein at least some of the ultrasonic acoustic waves indicate an operating condition of the apparatus.

6. The ultrasonic telemetry system of claim 4, wherein the power source comprises a power harvester to convert kinetic energy from the apparatus to electrical energy.

7. The ultrasonic telemetry system of claim 6, wherein the power harvester comprises a piezoelectric generator, a spring, and a mass disposed on the spring.

8. The ultrasonic telemetry system of claim 4, wherein a frequency of the ultrasonic acoustic waves indicates at least one of the one or more operating conditions and wherein the ultrasonic receiver is in physical contact with the apparatus.

9. An ultrasonic telemetry system, comprising:
two or more ultrasonic sensor nodes embedded within and spaced along an apparatus that is a shaft of a turbine and configured to rotate, each of the two or more ultrasonic sensor nodes configured to sense one or more operating conditions of the apparatus;
two or more blades disposed on the apparatus and spaced along the apparatus, wherein at least one of the two or more ultrasonic sensor nodes is disposed between two blades of the two or more blades, the two blades being disposed opposite one another on the apparatus, wherein a distance between at least one ultrasonic sensor node of the two or more ultrasonic sensor nodes and at least one of the blades is about 1 cm to about 8 cm;
an ultrasonic hub node disposed on the apparatus configured to receive ultrasonic acoustic waves indicative of the one or more operating conditions from at least one of the two or more ultrasonic sensor nodes; and
an ultrasonic receiver disposed proximate to the apparatus.

10. The ultrasonic telemetry system of claim 9, wherein the two or more ultrasonic sensor nodes are embedded within the apparatus at a depth of about 1 cm to about 5 cm and wherein the ultrasonic receiver is in physical contact with the apparatus.

11. The ultrasonic telemetry system of claim 9, wherein a frequency of the ultrasonic acoustic waves is about 80 kHz to about 1.5 MHz.

12. The ultrasonic telemetry system of claim 9, further comprising:
an enclosure surrounding at least a portion of the apparatus, wherein each of the ultrasonic sensor nodes is positioned within the enclosure, and wherein the ultrasonic hub node and the ultrasonic receiver are positioned external to the enclosure.

13. The ultrasonic telemetry system of claim 9, wherein each of the two or more ultrasonic sensor nodes comprises:
a power source;
a controller;
one or more sensors; and
one or more ultrasonic transducers configured to identify and monitor at least one of the one or more operating conditions, the one or more ultrasonic transducers configured to transmit ultrasonic acoustic waves indicative of the at least one of the one or more operating conditions.

14. A method of monitoring operating conditions of an apparatus, comprising:
rotating the apparatus, wherein the apparatus is a shaft of a turbine;
obtaining data related to one or more operating conditions of the apparatus by using two or more ultrasonic sensor nodes embedded within the apparatus, at least one of the ultrasonic sensor nodes disposed between two blades disposed opposite one another on the apparatus, the at least one ultrasonic sensor node disposed at a distance of about 1 cm to about 8 cm from at least one of the blades;
receiving, at an ultrasonic hub node disposed on or embedded within the apparatus, one or more ultrasonic waves from one or more ultrasonic sensors;
transmitting the one or more ultrasonic waves to an ultrasonic receiver adjacent to the apparatus; and
analyzing the one or more ultrasonic waves to evaluate the one or more operating conditions of the apparatus and determine if a defect has formed in the apparatus or at least one of the blades.

15. The method of claim 14, further comprising:
receiving, at one of the two or more ultrasonic sensor nodes, a command to perform a task related to the one or more operating conditions.

16. The method of claim 14, wherein the ultrasonic hub node is embedded within the apparatus.

17. The method of claim 14, wherein the one or more operating conditions include at least one of vibration, temperature, pressure, strain, stress, force, torque, rotational velocity, position, displacement, lubricant degradation, or chemical analysis of lubricant.

18. The method of claim 14, wherein the one or more ultrasonic waves represent asynchronous packets of information comprising a plurality of separate tones, wherein at least some of the ultrasonic waves indicate an operating condition of the apparatus.

19. The method of claim 14, further comprising:
determining whether the one or more operating conditions satisfies a threshold; and
upon determining the one or more operating conditions exceed the threshold, determining a remedial action to adjust the one or more operating conditions.

20. The method of claim 19, wherein the remedial action includes one or more of adjusting a rotational balance of the apparatus by repositioning a mass moveably coupled to the apparatus, adjusting a rotational velocity of the apparatus, or shutting down the apparatus.

21. The method of claim 14, wherein:
two or more blades are disposed opposite one another on the apparatus, and
at least one of the one or more ultrasonic sensor nodes is disposed between the two or more blades.

* * * * *